United States Patent Office 3,310,563
Patented Mar. 21, 1967

3,310,563
VAT DYESTUFFS OF THE ANTHRAQUINONE SERIES AND PROCESS FOR PREPARING THEM
Heinrich Sieber and Otto Fuchs, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 16, 1963, Ser. No. 273,285
Claims priority, application Germany, Apr. 21, 1962, F 36,625
3 Claims. (Cl. 260—274)

In German Patent 607,341 vat dyestuffs are disclosed which are obtained by condensing 4'-halogen-1',8'-naphthoylene-arylimidazoles or their derivatives or substitution products with 1-aminoanthraquinones to form the corresponding anthrimides and by treating these compounds with melting alkalis. The vat dyestuffs obtained by said process dye cotton grey-olive to green shades in a red to violet vat. Due to their bad properties to wet fastness, above all, however, to their very bad fastness to chlorine these dyestuffs have not gained any importance, in practice.

The present invention now relates to novel, valuable vat dyestuffs and to a process for preparing them; more particularly it relates to vat dyestuffs, which are obtained by condensing 4',5'-dichloro- or 4',5'-dibromo-1',8'-naphthoylene-arylimidazoles or their substitution products with 1-aminoanthraquinones in the presence of an acid-binding agent and heating the chlorine- or bromine-containing intermediate product in an acid amide, which is substituted or unsubstituted on the nitrogen, in the presence of an acid binding agent and in the presence or absence of a high-boiling organic solvent at a temperature ranging from 150° to 270° C. It has now been found that novel, valuable vat dyestuffs are obtained by condensing 4',5'-dichloro- or 4',5'-dibromo-1',8'-naphthoylene-arylimidazoles or their substitution products with 1-aminoanthraquinones in the presence of an acid-binding agent and heating the chlorine- or bromine-containing intermediate products, which probably correspond to one of the following formulae

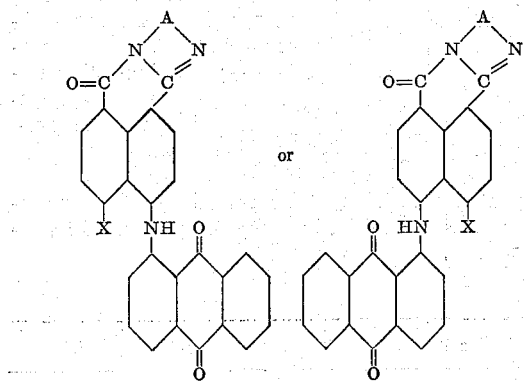

wherein A represents a phenylene or naphthylene radical, X represents a chlorine or bromine atom, and wherein the anthraquinone nucleus may contain substituents such as, for example, halogen atoms, alkyl or alkoxy groups or the benzoylamino group in an acid amide which is substituted or unsubstituted on the nitrogen, in the presence of an acid-binding agent and in the presence or absence of a high-boiling organic solvent at temperatures ranging from 150° to 270° C.

The olive-green to green vat dyestuffs obtainable by the process of the present invention are entirely different from those disclosed in German Patent 607,341 though similar in shade. The vat color is deep greenish blue. When dissolved in monohydrate or in sulfuric acid of 95% strength the color of the novel dyestuffs is completely different. Whereas, for example, the olive-green vat dyestuff obtained by treating the 4'-(anthraquinonylamino)-1',8'-naphthoylene-benzimidazole with melting alkalis according to the process disclosed in German Patent 607,341 dissolves in monohydrate to give a brown-orange solution and in sulfuric acid of 95% strength to give a deep red-brown solution, the color of the olive-green vat dyestuffs prepared by cyclization of 4'-(anthraquinonylamino)-5'-chloro - 1',8' - naphthoylene - benzimidazole or 5' - (anthraquinonylamino) - 4' - chloro - 1',8'-naphthoylene-benzimidazole according to the process of the present invention, when dissolved in monohydrate, is green and in sulfuric acid of 95% strength red-violet. Furthermore, the dyestuffs obtainable by the process described in German Patent 607,341 are completely destroyed already after a very short period of treatment with sodium hypochlorite liquor, whereas the novel dyestuffs are distinguished by a very good fastness to chlorine. Consequently, there is no doubt that the products obtained in the present process possess a constitution different from that of the dyestuffs already known, since their decisive characteristic features do not coincide. Dyestuffs of this kind have not yet been described in literature.

The preparation of the dyestuffs is advantageously carried out by heating for several hours to 150° to 200° C. 4',5'-dichloro- or 4',5'-dibromo-1',8'-naphthoylene-arylimidazoles or their substitution products with 1-aminoanthraquinones in the presence of an acid-binding agent as, for example, soda, potash, sodium or potassium acetate, in dimethylformamide, N-methylacetamide, N-methylpyrrolidone or other polar organic solvents, isolating the product formed during the reaction, washing it thoroughly and drying it. When operating in this manner, chlorine- or bromine-containing intermediates are obtained with good yield, which are then condensed advantageously in the following manner. In a high-boiling solvent, such as, for example, α-chloronaphthalene, the chlorine- or bromine-containing intermediate product is heated to the boil in the presence of an acid-binding agent, as, for example, sodium or potassium carbonate or sodium or potassium acetate, in an acid amide as, for example, acetamide, N-methyl-acetamide, pyrrolidone, N-methylpyrrolidone, benzamide or phosphoric acid-tris-dimethylamide. The dyestuff that forms already after a short time, is filtered off with suction, washed with α-chloronaphthalene, methanol and then with water. In this manner olive-green to green vat dyestuffs are obtained with excellent yield, which possess the above-described properties. The reaction can likewise be carried out in an acid amide in the absence of a high-boiling organic solvent.

The properties of wet fastness, especially the fastness to chlorine and to chlorite, and the fastness to light of the cotton dyeings prepared with the novel vat dyestuffs are very good.

The 4,5-dichloro- or 4,5-dibromo-naphthalic acid or its anhydride used as starting substance can be prepared advantageously by dissolving 1,4,5,8-naphthalene-tetracarboxylic acid or its anhydride in water with the addition of alkali metal hydroxides, carbonates, acetates or phosphates and reacting the solution obtained at a pH-range of 4 to 6.5 at a temperature in the range from 10° to 70° C. with chlorine or bromine or agents yielding these halogens.

The following examples illustrate the invention, but they are not intended to limit it thereto, the parts being by weight unless otherwise stated and the relationship of parts by weight to parts by volume being the same as that of the kilogram to the liter.

Example 1

34 parts of the condensation product of 4,5-dichloro-naphthalic acid and 1,2-diaminobenzene are suspended in 250 parts by volume of dimethylformamide and heated to the boil with 24 parts of 1-aminoanthraquinone and 8 parts of potassium carbonate. When the anthrimide has formed, the hot reaction product is filtered off with suction, washed first with dimethylformamide and then with water until neutral. The red-brown, crystalline condensation product is dried at 100° C. The yield is very good. After recrystallisation from nitrobenzene the compound melts at temperatures above 450° C.

Analysis.—Cl calculated: 6.7%; found: 6.7 and 6.8%. N calculated: 8.0%; found: 8.0 and 8.1%.

10 parts of the above anthrimide are introduced into 100 parts of α-chloronaphthalene, and 10 parts of potassium carbonate and 10 parts of N-methylpyrrolidone are added. The mixture is heated to the boil for about 2 hours. The formed dyestuff, which is obtained in the form of green crystal needles, is filtered off with suction, when still hot, washed first with α-chloronapthalene, then with methanol and water and dried. The dyestuff which is obtained in excellent yield dyes cotton olive-green shades in a blue vat.

The properties of wet fastness, above all the fastness to chlorine, to chlorite and to light of the cotton dyeings are very good.

Instead of potassium carbonate equivalent quantities of sodium carbonate, sodium or potassium acetate may be used.

Example 2

17 parts of the condensation product of 4,5-dichloro-naphthalic acid and 1,2-diamino-4-methylbenzene are heated at 150° C. for 5 to 6 hours together with 11 parts of 1-aminoanthraquinone, 3.5 parts of potassium carbonate and 150 parts by volume of dimethylformamide. When the condensation is complete, the mixture is cooled, filtered, washed and dried. The anthrimide obtained in good yield is converted into the dyestuff in the manner described in Example 1.

Cotton is dyed a somewhat more bluish olive-green shade than that described in Example 1.

Example 3

When heating equivalent quantities of the condensation product of 4,5-dichloro-naphthalic acid anhydride, 4-chloro-1,2-diaminobenzene, 1-aminoanthraquinone and potassium carbonate in dimethylformamide, a rapid condensation takes place. By the reaction, which is effected rapidly by heating the condensation product in α-chloronaphthalene with the addition of potassium carbonate and pyrrolidone, an olive-green dyestuff possessing properties similar to those described in Example 2 is obtained with good yield.

Instead of pyrrolidone acetamide, N-methylacetamide, benzamide or phosphoric acid-tris-dimethylamide may also be used.

Example 4

17 parts of the condensation product of 4,5-dichloro-naphthalic acid and 1,2-diaminobenzene are condensed as described in Example 1 in 200 parts of dimethylformamide with 4 parts of finely ground potassium carbonate and 17 parts of 1-amino-4-benzoylaminoanthraquinone. 20 parts of the anthrimide are heated to the boil for about 2 hours together with 200 parts of α-chloronaphthalene, 20 parts of potassium carbonate and 20 parts of N-methylpyrrolidone. The dyestuff, which is obtained in good yield, dyes cotton considerably more yellowish green shades than the dyestuffs described in the preceding examples.

Example 5

22 parts of the condensation product of 4,5-dibromo-naphthalic anhydride and 1,2-diaminobenzene are heated to the boil for 20 hours with 12 parts of 1-aminoanthraquinone, 7 parts of potassium carbonate and 80 parts of naphthalene. Since the bromine atoms are easily exchangeable, the green dyestuff which is identical with the one described in Example 1, forms in one operation. The reaction mixture is cooled to 140° C., diluted with dimethylformamide and filtered off with suction. The dyestuff obtained is washed first with hot dimethylformamide and subsequently with hot water and then dried.

Example 6

122 parts of 4',5'-dichloro-1',8'-naphthoylene-5,6-dichlorobenzimidazole, 111 parts of 1-amino-4-benzoyl-amino-anthraquinone and 24 parts of potassium carbonate are heated under reflux for 6 hours in 1200 parts of dimethylformamide. After having cooled the mixture to 110° C., the substance is filtered off with suction. The press cake is washed with 300 parts of dimethylformamide, 1000 parts of methanol and water and then dried.

100 parts of the grey-brown anthrimide obtained in the above-described manner are heated to the boil for 2 hours, with 60 parts of phosphoric acid-tris-dimethylamide and 15 parts of potassium carbonate in 800 parts of α-chloronaphthalene, while distilling off the reaction water. The dark green crystal sludge obtained is filtered off with suction, while still hot, and washed with hot α-chloronaphthalene until a green fluid runs off the filtrate. After having removed the adhering solvent by washing with methanol and the mineral salts by washing with water, the dyestuff is dried. It dyes cellulose material yellowish green shades in a dark blue vat. The dyeings possess excellent properties of fastness.

The following table contains a number of further dyestuffs which are obtained by the process described in Examples 1 to 6.

|   | 4',5'-dichloro-1',8'-naphthoylene-arylimidazole | Amino-anthraquinone | Tint |
|---|---|---|---|
| 7 | 4',5'-dichloro-1',8'-naphthoylene-benzimidazole. | 1-amino-4-methoxy-anthraquinone. | Green. |
| 8 | ----do---- | 1-amino-5-benzoyl-amino-anthraquinone. | Olive. |
| 9 | 4',5'-dichloro-1',8'-naphthoylene-5-chlorobenzimidazole. | 1-amino-4-benzoyl-amino-anthraquinone. | Yellowish green. |
| 10 | 4',5'-dichloro-1',8'-naphthoylene-5-methyl-benzimidazole. | ----do---- | Do. |
| 11 | 4',5'-dichloro-1',8'-naphthoylene-5-ethoxy-benzimidazole. | 1-amino-anthraquinone. | Olive. |
| 12 | 4',5'-dichloro-1',8 -naphthoylene-5-chloro-6-methyl-benzimidazole. | ----do---- | Do. |
| 13 | 4',5'-dichloro-1',8'-naphthoylene-5,6-dichloro-benzimidazole. | ----do---- | Do. |
| 14 | 4',5'-dichloro-1',8'-naphthoylene-naphthimidazole. | ----do---- | Green. |

We claim:
1. A dyestuff of the formula

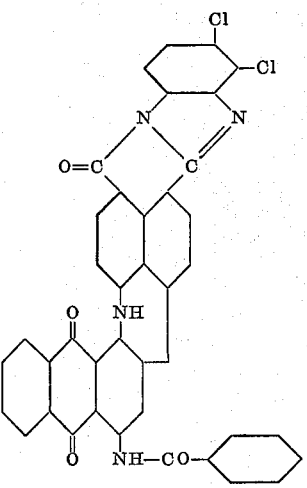

2. A dyestuff of the formula

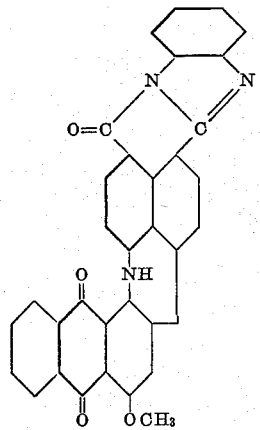

3. A process for making a dyestuff of the formula

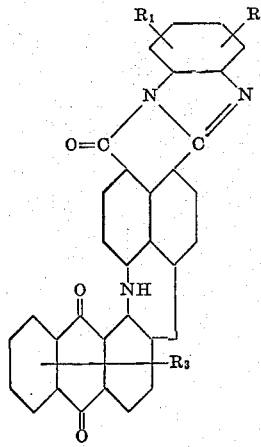

in which $R_1$ represents a member selected from the group consisting of a hydrogen atom, a chlorine atom, a lower alkyl group and a lower alkoxy group, $R_2$ represents a member selected from the group consisting of a hydrogen atom and a chlorine atom, and $R_1$ and $R_2$ together represent the group —CH=CH—CH=CH— with the proviso that $R_1$ and $R_2$ are linked in ortho-position, with respect to one another, to the phenylene radical, and $R_3$ represents a member selected from the group consisting of a hydrogen atom, a lower alkoxy group and a benzoylamino group, which comprises condensing 4',5'-dihalo-1',8'-naphthoylene-arylimidazole of the formula

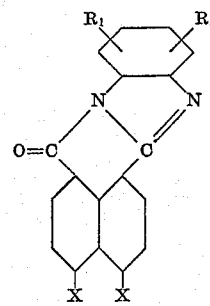

in which $R_1$ and $R_2$ have the meanings given above and X represents a member selected from the group consisting of chlorine and bromine atoms with an amino-anthraquinone selected from the group consisting of 1-amino-anthraquinone, a 1-amino-benzoylaminoanthranquinone and a lower alkoxy-substituted 1-amino-anthraquinone in a polar organic solvent in the presence of an acid-binding agent at a temperature between 150° and 200° C., and heating the intermediate thereby obtained of the formula

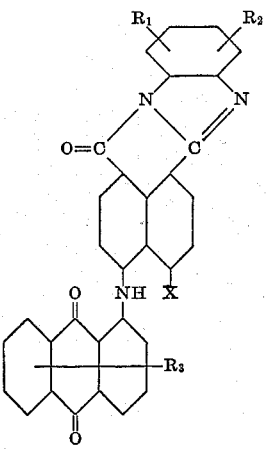

wherein $R_1$, $R_2$ and X have the meanings defined above and $R_3$ represents a member selected from the group consisting of a hydrogen atom, a benzoylamino group and a lower alkoxy group in an acid amide selected from the group consisting of acetamide, N-methylacetamide, pyrrolidone, N-methylpyrrolidone, benzamide and phosphoric acid-tris-dimethylamide in the presence of an acid binding agent and a high boiling organic solvent at a temperature between 150° and 270° C.

References Cited by the Examiner
UNITED STATES PATENTS

| | | | |
|---|---|---|---|
| 1,888,625 | 11/1932 | Eckert et al. | 260—282 |
| 1,973,787 | 9/1934 | Wolff | 260—274 |
| 2,023,479 | 12/1935 | Kunz et al. | 260—274 |
| 2,219,707 | 10/1940 | Kern et al. | 260—276 |
| 2,267,139 | 12/1941 | Schlichenmaier et al. | 260—277 |
| 2,658,898 | 11/1953 | Adams et al. | 260—272 |

FOREIGN PATENTS

| | | |
|---|---|---|
| 753,185 | 10/1933 | France. |
| 399,724 | 10/1933 | Great Britain. |
| 421,264 | 12/1934 | Great Britain. |
| 443,958 | 2/1936 | Great Britain. |

OTHER REFERENCES

Handbook of Chemistry and Physics, pp. 886–887, 26th ed., Cleveland, Chem. Rubber, pub. 1942, QD 65.C4.

WALTER A. MODANCE, *Primary Examiner.*

NICHOLAS RIZZO, *Examiner.*

NATALIE TROUSOF, *Assistant Examiner.*